Jan. 27, 1970 B. J. OKEY 3,492,413
TRANSISTOR COLOR DEMODULATOR WITH D.C. STABILIZATION
Filed May 4, 1967
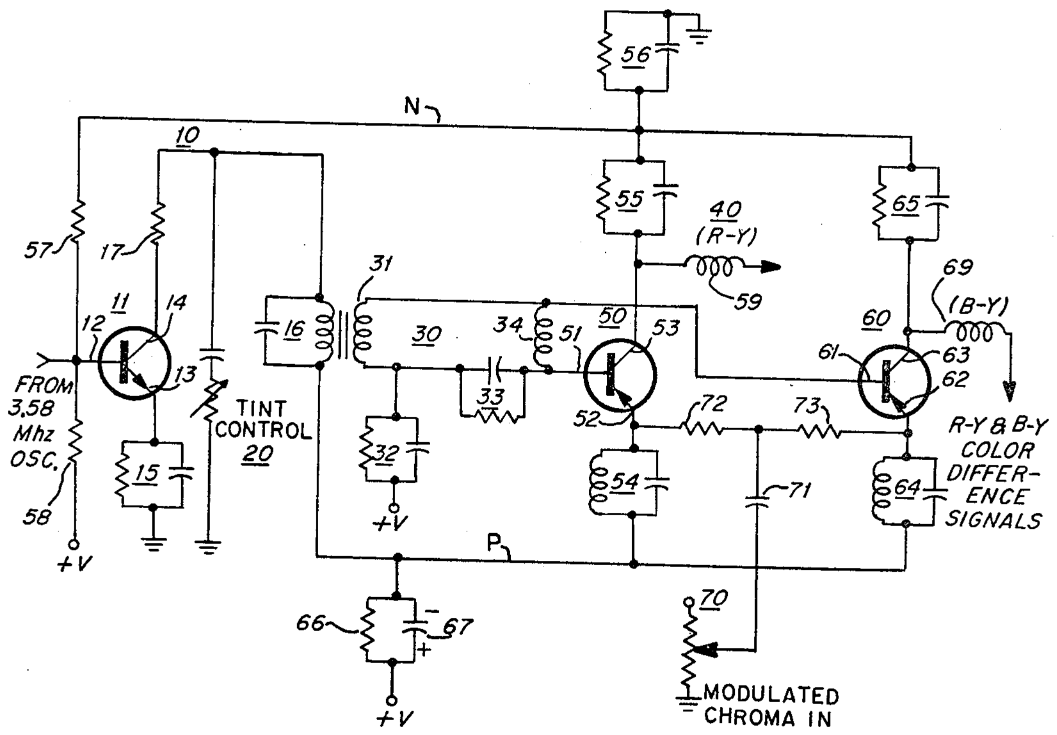
INVENTOR.
Bernard J. Okey
BY
Nicholas A. Camasto
ATTY.

United States Patent Office 3,492,413
Patented Jan. 27, 1970

3,492,413

TRANSISTOR COLOR DEMODULATOR WITH D.C. STABILIZATION

Bernard J. Okey, Addison, Ill., assignor to Admiral Corporation, Chicago, Ill., a corporation of Delaware Filed May 4, 1967, Ser. No. 636,086
Int. Cl. H04n 5/44
U.S. Cl. 178—5.4 10 Claims

ABSTRACT OF THE DISCLOSURE

A single-ended transistorized color demodulator with DC stabilization provided by a DC feedback loop to the source of reference signals.

DISCLOSURE

This invention relates to transistorized demodulators in color television receivers. Transistorized demodulators are being increasingly used in color television receivers and have obvious advantages over vacuum tube circuits. Such demodulators are usually of the "double switched" type and generally include separate bias circuit arrangements for stabilizing the operating points of the transistors. Operating point drift may have adverse effects on the demodulator output (it is of extreme importance in single-ended demodulators where the transistors are essentially "reference biased"). Isolating stages are also generally interposed in the chrominance signal, often called chroma, injection path to preclude cross talk between the demodulator transistors. These circuits have performed their functions adequately, although they are not inexpensive.

The principal object of this invention is to provide a color demodulator circuit which utilizes a minimum number of components.

Another object of this invention is to provide a single-ended transistorized chroma demodulator including means maintaining the DC operating level of the transistors substantially constant.

A further object of this invention is to provide a single-ended transistor chroma demodulator wherein the transistors are substantially biased by the reference signals applied to their input circuits and wherein DC feedback is employed to stabilize their operating conditions.

An advantage of this invention is in the simple manner with which the circuit may be provided with a subcarrier reference phase shifting circuit for controlling the phase of the demodulated chroma information and, consequently, the tint or hue of the reproduced color picture.

Other objects and advantages of the invention will become apparent upon a reading of the specification in conjunction with the drawing which depicts a schematic diagram of the demodulator.

Upon referring to the drawing, it will be noted that the conventional components of a color television receiver are not disclosed. With the present state of the color television art, it is believed unnecessary to disclose in detail standard receiver parts such as tuner, I.F. amplifier, video amplifier, video and audio detectors, deflection and synchronizing circuits, etc. Rather, the drawing merely indicates that the input of transistor 11 is fed from a 3.58 mHz. oscillator. To those skilled in the art, this will be recognized as a standard reference oscillator in color television receivers which, under control of a transmitted color burst signal, reproduces a reference signal of like frequency and phase. Similarly, at the outputs of transistors 50 and 60, take-offs through coils 59 and 69, respectively, are labeled $R-Y$ and $B-Y$. These designations will be recognized as signifying red and blue color difference signals. In conventional receiver techniques, the $R-Y$ and $B-Y$ signals are matrixed to produce a $G-Y$ signal and the three primary color difference signals are then coupled to the kinescope where the Y signal (luminance component) is added.

Those skilled in the art will also know that the modulated chrominance information consists of amplitude modulations of two quadrature phases of the color subcarrier. These amplitude modulations represent two signals of differing bandwidths, commonly called I and Q signals, which may, by proper demodulation, be used to recover the three primary color difference signals. These details are relatively unimportant to an understanding of the demodulator of the invention and the mechanics of how the $R-Y$ and $B-Y$ color difference signals are recovered from the original modulations is adequately covered in the literature. It is also recognized that it is not essential to obtain $R-Y$ and $B-Y$ per se, but rather any two color difference signals A and B may be recovered and, by appropriate operations thereafter, used to reproduce the original color information.

A signal translation stage 10, which in this embodiment functions as a tuned amplifier, includes a transistor 11 of the NPN type having a base 12, an emitter 13 and a collector 14. Base 12 is coupled to the output of a 3.58 mHz. oscillator. This transistor is biased through a resistor 58 connected to a DC voltage source +V. The output circuit of transistor 11 is fed from a line labeled P through a tuned circuit 16 and a series resistor 17 which is employed for stabilization of the amplifier. A DC return and bypass circuit 15 is connected to emitter 13 of transistor 11. A tint control circuit 20, consisting of a capacitor and series connected variable resistor, is connected between the junction of resistor 17 and tuned circuit 16 and ground.

Demodulator 40 consists of a pair of transistors 50 and 60 of the PNP type having base electrodes 51 and 61, emitter electrodes 52 and 62, and collector electrodes 53 and 63, respectively. Each of these transistors has an emitter input circuit, a base input circuit and a collector output circuit. A phase displacement circuit 30 is provided for supplying appropriate 3.58 mHz. reference signals to the respective base inputs of transistors 50 and 60. For proper $R-Y$ and $B-Y$ recovery in the output of the demodulators, these reference signals should bear a 90° phase displacement relationship to each other and a predetermined phase relationship to the burst signal. The phase displacement circuit includes a winding 31 coupled to tuned circuit 16 of transistor 11 and the combination of a coil 34 and RC network 33 serially connected with winding 31. The junction of winding 31 and coil 34 is connected to base 61 of transistor 60 and the junction of coil 34 and RC network 33 is connected to base 51 of transistor 50. DC stability of the reference voltage bias on transistors 50 and 60 is provided through RC network 32.

A modulated chroma signal is supplied across a potentiometer 70 to the respective emitter input circuits of the demodulator transistors. An AC network is provided for this purpose and includes a common capacitance 71 connecting the tap on potentiometer 70 to the junction of a pair of resistors 72 and 73, which in turn serially interconnect emitters 52 and 62. These emitters are each connected to a line P through respective LC networks 54 and 64. These LC circuits may be replaced by small resistances provided the video gain and chrominance drive are not impaired. Line P in turn is supplied from +V through an RC network including a resistor 66 and an electrolytic capacitor 67. Finally, collectors 53 and 63 are connected to a line N through respective RC networks 55 and 65. Line N in turn is connected to ground or reference potential through an RC network 56. The input of translation stage 10 is coupled to line N through a resistor 57 connected to base 12 of transistor 11. Thus, signal translation stage 10 and transistors 50 and 60 are all supplied DC potential from line P which is ultimately connected to +V. The DC paths for transistors 50 and 60 are completed through separate RC network connections to line N and a common RC network from line N to ground.

In operation, transistor 11 serves as a tuned amplifier for developing across tuned circuit 16 an amplified replica of the 3.58 mHz. oscillator signal applied to its base. Transistor 11 is operated on the linear portion of its gain versus forward bias characteristic curve at approximately maximum gain. Maximum output—consistent with maximum linearity—dictates that the transistor be operated in its forward biased region, at a point just beyond the maximum gain point.

Phase displacement circuit 30 is coupled to tuned circuit 16 and effectively produces a pair of reference signals of differing phase. For example, the reference signal applied to base 61 of transistor 60 is substantially in phase with the signal in tuned circuit 16 whereas that applied to base 51 is approximately displaced by 90° therefrom as a result of coil 34 and RC network 33. Phase displacement network 30 is connected to +V through RC network 32, and consequently, in the absence of reference voltage, a reverse bias appears across the respective bases of the demodulator transistors. Therefore, transistors 50 and 60 are driven conductive only during occurrence of the negative portions of the reference signals applied to their bases. Further, they are driven conductive at different phase points of the 3.58 mHz. subcarrier signal and thus, are capable of demodulating the aforesaid phase displaced-amplitude modulations which constitute the chrominance signal.

The chrominance signal is supplied to the emitter circuits of transistors 50 and 60. By adjustment of the phase displacement between the reconstituted reference signals, and the phase displacement between the reference signals and color burst, innumerable combinations of color signals may be obtained in the output circuits. By selecting the reference signals to be 90° apart and at a predetermined phase with respect to the original subcarrier, $R-Y$ and $B-Y$ color difference signals may be obtained.

In circuits of this type, a problem of cross talk generally arises since the reference signals applied to the base input circuits also appear across the emitter input circuits. Consequently, unless some provision for isolation is made, reference signals of the wrong phase will cause erroneous demodulation. In the instant circuit, low impedance LC networks 54 and 64 are provided in conjunction with relatively high impedance isolation resistors 72 and 73 to minimize any cross talk. Practically, the resistance of these resistors is about twenty times the input impedance of the transistors and about four times the impedance of the chroma source. Optimum values for these resistors will naturally be dependent upon the chroma drive source impedance, emitter follower resistance and degree of chroma attenuation which may be tolerated.

The demodulators are effectively operated in parallel and their combined DC currents are supplied to the transistors from line P. The potential on line P is determined by the drop across the RC network of resistor 66 and capacitor 67. It will be noted that the DC current required by transistor 11 also flows through this latter RC network and influences the potential on line P.

The provision of chroma potentiometer 70 allows the amplitude of the modulated chroma signal applied to the input circuits of the transistors to be varied with consequent changes in amplitude of the demodulated color difference signals. Changing the amplitude of these color signals results in a change in the saturation level and hence, this potentiometer may be advantageously employed as a viewer color intensity control. Also, it is essential that some form of tint or hue control be provided for the viewer. Tint controls generally change the phase of the demodulator color burst so that the reference signals produced under the control thereof are displaced from the normal position although their phase difference is unchanged.

In signal translation stage 10, transistor 11 is operated with a high Q tuned circuit load. The characteristics of a high Q tuned circuit are such that a substantial phase change in the voltage appearing across the tuned circuit is achieved by a very small amount of detuning. Hence, the provision of tint control 20 across the output circuit of transistor 11 allows a degree of detuning to provide for a change in phase in the voltage appearing across tuned circuit 16. The arrangement shown has the added advantage that it can be arranged to have little amplitude change with respect to phase change. An amplitude change of 10% is typical in these applications.

As mentioned earlier, it is essential to maintain DC stabilization of these transistors. The present circuit includes a feedback arrangement providing for this. For example, let it be assumed that the output signal voltage from transistor 11 increases for some reason (a hue control adjustment may be the motivating factor). The amplitude of the reference potentials applied to the demodulator transistors increases and both transistors are driven more heavily conductive, which results in increased DC current flow and a positive swing of the potential on line N. More positive potential on line N results in an increased bias potential on transistor 11 with a slight shift in operating point and an increase in base-emitter current flow. Thus, transistor 11 is driven more heavily conductive and draws more current through the RC network connected to line P, which results in a negative swing in the potential on line P. As line P becomes less positive, the reverse bias on transistors 50 and 60 increases, making it more difficult to drive them conductive. Thus, the overall effect is one of stabilization of the DC in the demodulator transistors.

In the event the output of transistor 11 decreases, the reverse occurs with transistors 50 and 60 initially being driven less heavily, the potential of line N swinging negative and diminishing the bias on transistor 11. The potential on line P swings positive and the reverse bias on transistors 50 and 60 is decreased, such that their average conduction current is again stabilized.

Transistor 11 is preferably biased on the forward portion of its gain versus bias characteristic curve. This is done primarily for purposes of securing an extremely linear operating portion of the curve, but has a laudable side effect which yields AC signal compensation for assisting in DC stabilization. Thus, with transistor 11 biased slightly beyond its maximium gain bias point, an increase in its DC bias condition results in a slight decrease in gain. Similarly, a decrease in its bias results in an increase in gain. In the first example discussed, an increase in AC signal output from transistor 11 drives the potential on line N positively. The increased bias potential still causes increased conduction in transistor 11, and also shifts the operating bias further on the forward bias characteristic resulting in a decrease in signal gain. As seen previously, the DC through the demodulator transistors is diminished by an increase in reverse bias. This action is assisted by also diminishing the amplitude of the reference signals applied so that part of the DC compensation comes from the DC feedback loop per se, and part from changing the gain of transistor 11 (AC compensation). The opposite also holds true.

It was mentioned previously that phase displacement circuit 30 was connected to the respective base electrodes of the demodulator transistors through an RC network 32 to a source of +V potential. The action of this connection in reverse biasing the demodulator transistors has been described. By selecting the time constant of RC network 32 appropriately, the bias on the demodulator transistors may be made relatively noise immune. Under normal operating conditions, the actual biases on the transistors are a function of the reference signal amplitudes and the time constant of the RC network 32. Short duration noise impulses are effectively prevented from influencing the DC bias on the transistors.

What has been described is a simple, novel, low cost and efficient transistorized color demodulator of high performance capability. It is recognized that numerous modifications and departures in the circuit as shown may be made by those skilled in the art without departing from the true spirit and scope of the invention as set forth in the claims.

The embodiments of the invention in which an exclusive property or privilege is claimed are defined as follows:

1. In a color television receiver including a source of modulated chroma information and a source of subcarrier signal of predetermined phase, a demodulator comprising; first and second transistors each having a first and a second input circuit and an output circuit; chroma signal means applying said modulated chroma information to both said first input circuits; signal translation means, coupled to said source of subcarrier signal, having phase displacement means for producing a pair of phase displaced reference signals; means applying said phase displaced reference signals to said second input circuits respectively; power supply means commonly supplying said transistors and including circuit means responsive to changes in DC level therein; and feedback means, coupled between said circuit means and said signal translation means, stabilizing said DC levels of said transistors by varying the operating point of said signal translation means as a function thereof.

2. In a color television receiver as set forth in claim 1 wherein said signal translation means include a third transistor biased on the forward portion of its gain versus bias characteristic such that the gain thereof is also varied in response to changes in said DC level.

3. In a color television receiver as set forth in claim 2 wherein said chroma signal means includes a pair of impedance elements serially interconnecting said input circuits, and a capacitor coupling said modulated chroma information to the junction of said impedance elements.

4. In a color television receiver as set forth in claim 3 wherein said phase displacement means comprises a high Q tuned circuit connected as the load for said third transistor and further including a variable RC network for changing the phase response of said tuned circuit whereby the phases of said reference signals may be varied without substantially changing the phase displacement therebetween.

5. In a color television receiver as set forth in claim 2 wherein said phase displacement means comprises a high Q tuned circuit and wherein said signal translation means comprises a third transistor; power supply means connected between said high Q tuned circuit and said third transistor whereby the load current for said third transistor traverses said tuned circuit; means biasing said third transistor on the forward portion of its gain versus bias characteristic such that changes in bias thereof are accompanied by changes in signal gain as well as changes in DC level; and a variable RC network coupled across said third transistor adjusting the phase of said high Q tuned circuit whereby both said reference signals may be phase displaced from said subcarrier signal while retaining their individual phase displacement.

6. In a color television receiver as set forth in claim 5 wherein said power supply means includes two RC networks, one of which is traversed by currents flowing in said first and second transistors and the other of which is traversed by all currents flowing in said transistors, said circuit means comprising one of said RC networks.

7. In a color television receiver as set forth in claim 6 wherein said phase displacement means includes a winding inductively coupled to said high Q tuned circuit forming a portion of the bias circuit for said first and second transistor input circuits, said bias circuit also including an RC network coupled to a source of voltage, whereby the bias on said first and second transistors is substantially unaffected by short duration noise impulses.

8. A transistor demodulator for a color television receiver including a source of modulated chrominance information, a source of 3.58 mHz. oscillations and a source of DC potential having poor voltage regulation, comprising; a first and second transistor each having emitter, base and collector electrodes; means applying said modulated chrominance information to said emitter electrodes; phase displacement means powered by said DC source and coupled to said source of 3.58 mHz. oscillations for producing first and second phase displaced reference signals; means applying said first reference signal to the base electrode of said first transistor and said second reference signal to the base electrode of said second transistor; means coupling the emitter-collector direct current paths of said transistors in parallel across said source of DC potential; DC means responsive to the direct current level in said parallel circuit; and feedback means, interconnecting said DC means and said phase displacement means, altering the operating characteristics of said phase displacement means to change the loading on said DC source whereby both the DC level in said parallel path and the magnitudes of said first and second reference signals are held substantially constant.

9. The transistor demodulator of claim 8 wherein said DC means comprises an RC network; said RC network being serially connected with said parallel circuit across said source of DC potential and having a time constant such that it is substantially nonresponsive to all but direct current.

10. The transistor demodulator of claim 8 wherein said phase displacement means is coupled to said base electrodes from a DC source for normally reverse biasing said first and second transistors; said transistors being driven conductive responsive to said reference signals; and a long time constant RC network in series with said phase displacement means whereby the reverse bias on said first and second transistors is substantially unaffected by spurious noise signals.

References Cited

UNITED STATES PATENTS

| | | | |
|---|---|---|---|
| 2,766,321 | 10/1956 | Parker | 178—5.4 |
| 2,941,031 | 6/1960 | Chandler | 178—5.4 |
| 2,980,760 | 5/1961 | Larky | 178—5.4 |
| 3,294,900 | 12/1966 | Kool | 178—5.4 |

ROBERT L. GRIFFIN, Primary Examiner

JOHN C. MARTIN, Assistant Examiner